United States Patent [19]
Pepper

[11] Patent Number: 4,825,986
[45] Date of Patent: May 2, 1989

[54] REMOTELY CONTROLLABLE CABLE ASSEMBLY

[75] Inventor: Donald F. Pepper, San Gabrial, Calif.

[73] Assignee: Wyle Laboratories, El Segundo, Calif.

[21] Appl. No.: 133,286

[22] Filed: Dec. 14, 1987

Related U.S. Application Data

[63] Continuation of Ser. No. 528,960, Sep. 2, 1983, Pat. No. 4,730,089.

[51] Int. Cl.$^4$ ...................... H01H 9/00; H02G 11/02
[52] U.S. Cl. .............................. 191/12.4; 191/12.2 A
[58] Field of Search ............ 191/12.2 A, 12.4, 12.2 R; 200/52 R, 61.15, 153 F; 242/54 R; 307/9, 126, 132 R, 140, 147

[56] References Cited

U.S. PATENT DOCUMENTS

| | | | |
|---|---|---|---|
| 3,277,254 | 10/1966 | Richards | 200/52 R |
| 3,602,728 | 8/1971 | Carpenter | 191/12.2 A X |
| 4,692,569 | 9/1987 | Winner | 191/12.2 A X |

Primary Examiner—Johnny D. Cherry
Assistant Examiner—Joseph D. Pape
Attorney, Agent, or Firm—Freilich, Hornbaker, Rosen & Fernandez

[57] ABSTRACT

A cable assembly is described, for safely connecting an electrical power source such as an electrical outlet at an airport, to a power consuming device such as an aircraft. The assembly includes an electrical cable (18) with a connector (16) at one end for engaging the receptacle on an aircraft to supply power thereto, and a relay (30) at the inner end of the cable which can connect and disconnect a power source to the cable. "On" and "off" power switches (32, 34) are located near the outer end of the cable. The "on" switch enables a workman to operate the remote relay to turn on the power immediately after he has connected the outer end of the cable to the power consuming device. This encourages the workman to apply a voltage to the cable only after the connection is made, to avoid sparks that might ignite flammable fumes. The cable also includes two switches (102, 126) near its outer end for operating a motor that extends or retracts the cable from a cable storage device, the motor operating only while the switch continues to be manually depressed. This assures that the workman will hold the connector end of the cable above the ground while winding it up, to avoid damage to the outer end of the cable.

3 Claims, 2 Drawing Sheets

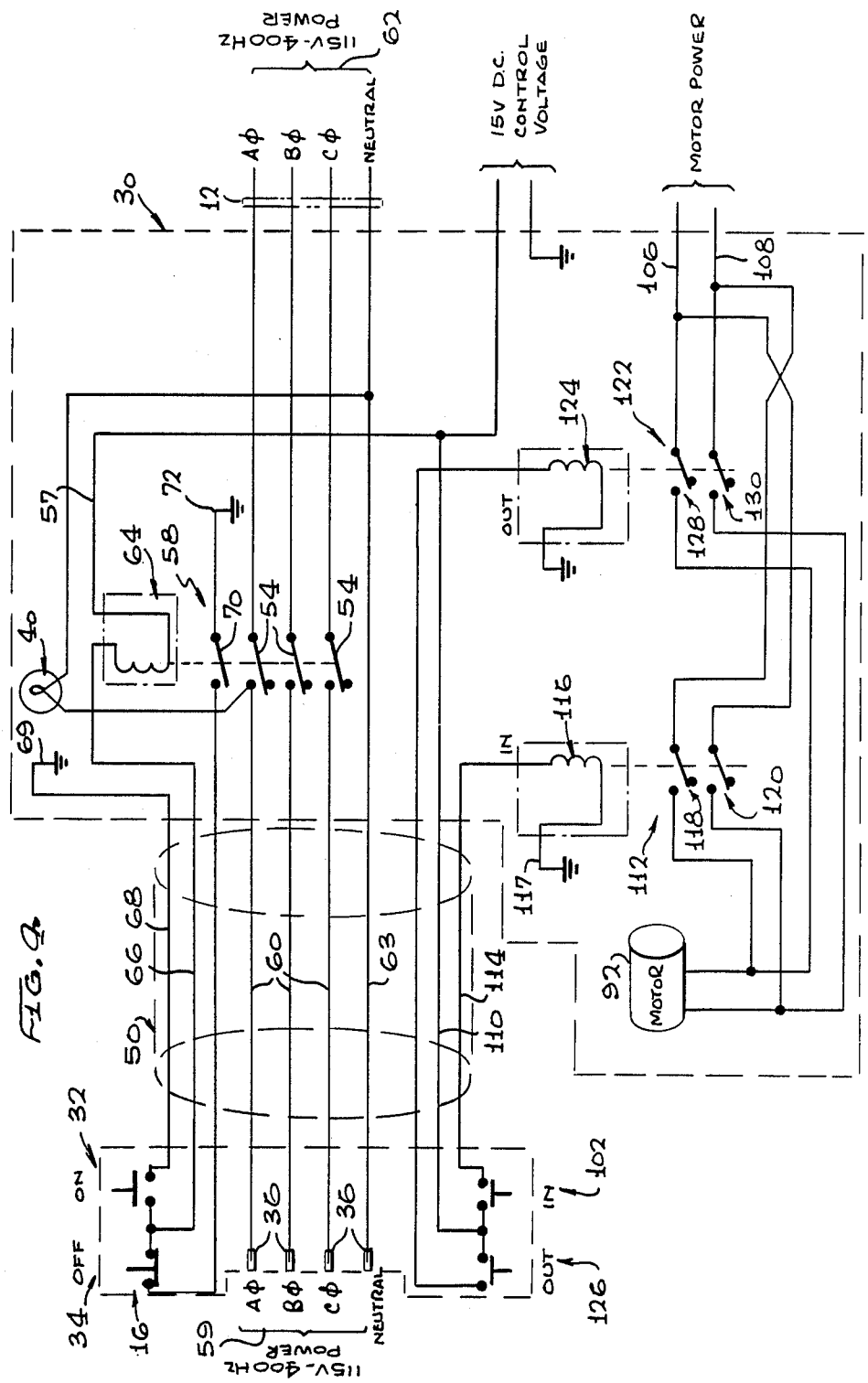

REMOTELY CONTROLLABLE CABLE ASSEMBLY

This is a continuation, of application Ser. No. 528,960, filed Sept. 2, 1983, now U.S. Pat. No. 4,730,089 issued Mar. 8, 1988.

BACKGROUND OF THE INVENTION

At airports, electrical power is often applied to airplanes through a cable assembly, or cable, that can be extended from a storage device, to allow a workman to carry the outer or connector end of the cable to the airplane and connect it to a receptacle on the airplane. Workmen are supposed to operate a power switch that applies voltage to the cable only after the connector has been connected to the aircraft. However, workmen sometimes try to save the time of running back to the storage device to turn on power after making the connection to the aircraft, by turning on power before carrying the connector end of the cable to the aircraft. This presents the danger that a spark may be created during connection of the connector at the end of the cable to the aircraft, which may ignite flammable fumes and cause a fire.

Another difficulty encountered in the use of such a cable, is in encouraging workmen to hold the outer end of the cable above the ground while the cable is retracted into the storage device. Workmen sometimes try to save time by operating a switch that retracts the cable while going about other duties. A cable assembly that encouraged workers to use cables in the proper manner—(1) by connecting power to the cables only after connections have been made to the aircraft or other power consuming device, and (2) to hold the outer end of the cable above the ground while the cable is being retracted for storage—would encourage safe and otherwise proper handling of cables that are used to connect power to a remote power consuming device.

SUMMARY OF THE INVENTION

In accordance with one embodiment of the present invention, an apparatus is provided for safely connecting an electrical power source, such as an electrical outlet at an airport, to a power consuming device, such as an aircraft. The apparatus includes an electrical cable with inner and outer end portions, the cable having power conductors and having a connector at the outer end for connection to the power consuming device. The cable also includes at least one manually operable switch located at its outer end portion for operating a relay or the like that is connected to the inner end of the cable. In one apparatus, when the switch at the outer end of the cable is operated to close a relay, the relay connects the power conductors to a power source, so power can flow to the power consuming device. This allows the workman who has just connected the connector at the outer end of the cable, to turn on the power without walking back to the inner end of the cable. In another device, the switch at the outer end portion of the cable operates a motor that retracts that cable into a storage device, but only so long as the switch continues to be manually operated. This assures that a workman will be holding the outer end of the cable above the ground as the cable is being retracted.

The novel features of the invention are set forth with particularity in the appended claims. The invention will be best understood from the following description when read in conjunction with the accompanying drawings.

BRIEF DESCRIPTION OF THE DRAWINGS

FIG. 4 is a schematic diagram of the apparatus of FIG. 1, showing the electrical circuitry thereof.

DESCRIPTION OF THE PREFERRED EMBODIMENT

Figure 1:
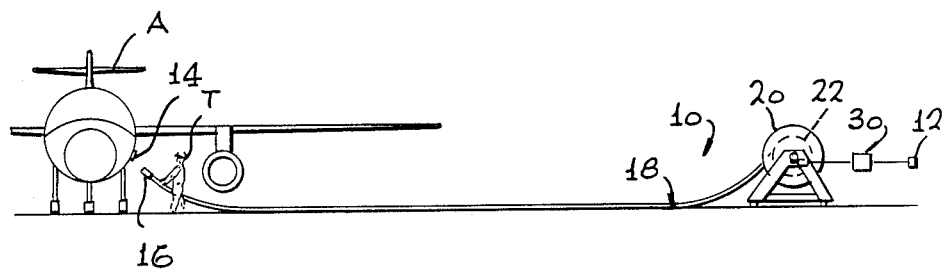
FIG. 1 is a side view of electrical connecting apparatus constructed in accordance with the present invention.

FIG. 1 illustrates a system 10 for connecting a power source 12 such as a power outlet at an airport, to a power consuming device 14, such as the electrical system of an aircraft A that is to be serviced. A workman or technician T typically grasps the outer or connector end portion 16 of an electrical cable, or cable assembly 18 and pulls it towards the aircraft A. Meanwhile, the cable extends from a storage device 20 such as a reel, so that only the inner end portion 22 of the cable assembly remains wrapped about the reel. When the outer portion of the cable assembly reaches the aircraft, the technician connects the outer end of the cable assembly to the aircraft circuit 14. The technician then must turn on a switch or relay located near the cable storage device 20, to supply a high voltage between conductors of the cable 18 so that electricity is supplied to the airplane. When the aircraft has been serviced, the technician turns off the power, disconnects the outer end portion 16 of the cable from the aircraft, and then operates a motor at the storage device 20 to retract the cable assembly thereto.

One important problem that arises in operation of the system, is that technicians sometimes do not wait until after the outer end portion 16 of the cable assembly is connected to the aircraft before turning on the power. Instead, they turn on the power while they are at the storage device 20 and are just starting to extend the cable. A typical voltage at which power is supplied to the plane is 115 volts. As connection is made between the outer end of the cable and the aircraft, a spark may be created at the moment of connection. Where there is spilled fuel on the ground, such a spark may ignite the fuel and cause a fire. Another problem that arises is damage to the cable, and especially to the outer end thereof, as it is dragged along the ground in retracting the cable assembly into the storage device. Technicians sometimes turn on the motor that operates the storage device and then perform other duties. The cable may become damaged if it is pulled against another object during retraction, and in any case it will become abraded as it is pulled along the ground.

Figure 2:
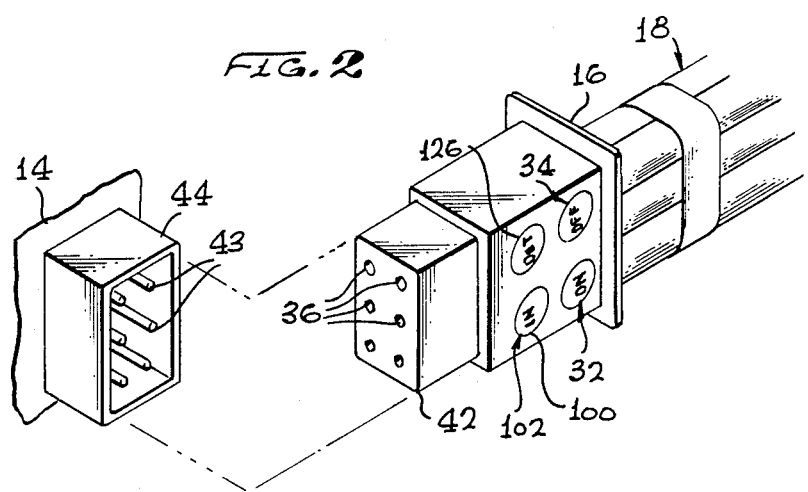
FIG. 2 is a partial perspective view of the apparatus of FIG. 1, showing the outer end portion of the cable.

In accordance with one feature of the present invention, a circuit 30 is provided whichconnects to the inner end portion 22 of the cable assembly to turn on and off power to the cable assembly and to the connector at the outer end 16 thereof, with a portion of the circuit 30 being controlled by a switch that is located at the outer end 16 of the cable assembly. As shown in FIG. 2, the outer end of the cable assembly includes a pair of switches 32, 34 with push buttons labeled "on" and "off". When the "on" button is depressed, a relay in the circuit 30 closes to apply a voltage between a group of terminals 36 at the outer end portion of the cable assembly. A light (at 40 in FIG. 4) may be added at the outer or inner end of the cable assembly to indicate that the cable is "hot" in that high voltage power is applied to it. The technician initially presses the "off" button at 34 to open the power circuit, When he reaches the aircraft he mates the outputs terminals 36 of the connector to the input terminals 43 of a connector 44 at the power consuming device such as the airplane. The technician then depresses the "on" button at 32 to apply power to the airplane.

The number of power conductors 36 that are used to transmit power, depends on the type of power transmitted. DC power requires two conductors, single phase AC requires two conductors, 3-phase DELTA connected power requires three conductors, and 3-phase WYE connected power requires four conductors. Most commercial aircraft use DC or 3-phase WYE connected power, the latter being shown in FIG. 2.

There are several different types of cable storage devices available, including a cable reel shown in FIG. 1, a pantograph device, devices having telescoping cable trays, and a device that includes a pair of rollers with the cable pressed between them for pushing the cable into a storage bin or pulling it out of the bin.

FIG. 4 illustrates some of the details of the electrical system, including those of the circuit 30. The cable assembly includes a cable bundle 50 and the connector 16. The power lines are shown as including four conductors 59 of a 3-phase WYE power connection, with three of them 60 connected through a group of relay switches 54 of a nonlatching relay 58 to a WYE power source 62. A fourth conductor 63 is continually connected to the power source 62. All four conductors 59 end in the connector terminals 36. The coil 64 of the relay 58 has one side connected through a wire 57 to a low control voltage such as 15 volts. The other side of the relay coil is connected through a switch conductor 66 which extends along most of the length of the cable to the "on" and "off" switches 32, 34. The other side of the "on" switch is connected through a conductor 68 to a ground connection at 69. The other side of the "off" switch is connected at 72. The "off" switch is a normally closed switch, that is opened only while manually depressed, while the "on" switch is normally open. When the "on" switch 32 is closed, sensing current, or electricity, at 15 volts passes through the coil 64 of the relay 58 to close the power switches 54 to apply power to the power conductors 59 that supply power to the power consuming device such as the airplane.

While the terminals 36 at the outer ends of the power conductors 58 are exposed to the environment at the time that they closely approach the aircraft connector 44 (FIG. 2), the "on" switch 32 which controls the application of power to the power conductors, is completely enclosed and is isolated from the environment so that any small spark across its switch contacts will not ignite fumes from spilled fuel. The relatively low voltage of 15 volts across the "on" switch contacts, minimizes the possibility of generating a spark, and also minimizes insulation requirements so a small switch can be used.

A technician using the present cable assembly makes sure that power is off as he unwinds cable from the reel 22 and approaches the aircraft. After the technician mates the connector 42 to the aircraft connector 44, he depresses the "on" switch 32 to immediately begin the application of power to the aircraft. The technician does not spend time and effort walking back to the area of the power relay to turn on the power, and therefore has no incentive to violate regulations and turn on the power prior to connecting the outer end of the cable to the aircraft. Prior to disconnecting the outer end of the cable from the aircraft, the technician depresses the "off" switch 34. Depression of the "off" switch stop current flow through the relay coil 64, which opens all of the switches of relay 58, including the power switches 54.

Figure 3:
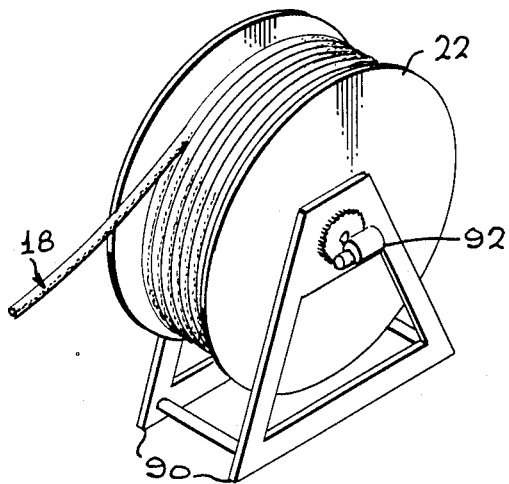
FIG. 3 is a partial perspective view of the apparatus of FIG. 1, showing the windup reel thereof.

FIG. 3 shows details of one cable storage device, in the form of a reel 22 rotatably mounted on a pair of stands 90. The reel can be rotated in either of two opposite directions by a reel driving motor 92. As mentioned above, when the technician disconnects the connector 42 at the outer end of the cable from the airplane, and operates the reel motor 92 to wind up the cable on the reel, it is desireable for the technician to hold the outer end of the cable above the ground as the reel is retracting the cable. This has the advantage of keeping the outer end of the cable above the ground so the connector and switches are not damaged, and in allowing the technician to apply some tension that minimizes the abrasion of the middle of the cable along the ground. To wind up the cable, the technician depresses an "in" button 100 of a retraction switch 102. This causes the motor 92 to be energized to turn the reel in the wind up direction. However, the motor 92 will be energized to turn, only so long as the button on the retraction switch 102 continues to be manually depressed. Of course, such manual depression can continue only so long as the technician continues to hold the outer end of the cable.

As shown in FIG. 4, the motor 92 is powered from a power supply which includes a pair of current-conductors 106, 108 that have a voltage difference between them. When the "in" switch 102 is depressed, it connects a conductor 110 which is at a low voltage such as 15 volts above ground, to a first reel conductor 114 which leads to one side of the coil 116 of the relay 112. The other side of the coil 116 is connected to a ground connection 117. When the "in" switch 102 is closed, so current flows through the relay coil 116, a pair of relay switches 118, 120 are closed to pass current through the motor 92 so as to turn the reel in a direction to wind up the cable thereon. The relay 112 is a nonlatching relay, so that when the "in" switch is not closed, the relay switches 118, 120 are automatically opened, and the motor 92 is de-energized to stop rotation of the windup reel.

The motor circuit also includes another relay 122 with a relay coil 124 that is connected to an "out" switch 126 (FIG. 2). When current passes through the relay coil 124 (FIG. 4), a pair of relay switches 128, 130 are temporarily closed to energize the motor so it turns in the opposite direction to turn the reel in a direction to pay out the cable. The relay coil 124 is connected between ground and the "out" switch 126 that connects to the 15 volt conductor 110. The four switch 32, 34, 102, 126 could be connected through optical fibers or other means to the relay, and solid state relay equivalents can be used.

Thus, the invention provides apparatus for safely connecting an electrical power source, such as an electrical outlet at an airport, to a power consuming device, such as an aircraft. The apparatus includes a cable with an outer end portion that is remote from the power source and which must be connected to the power consuming device, and that has switches at its outer end portion. One of the switches can include a switch that operates a relay connected to the inner end of the cable, to connect power to the cable. This discourages the technician from connecting the power source to the cable before he carries the outer end of the cable to the power consuming device and makes connection to it, to thereby avoid the possibility of creating sparks near the power consuming device that could cause a fire or explosion. The switch that controls the power-connecting relay can be connected through a conductor that carries electricity at a much lower voltage than the voltage applied between the power conductors of the cable, to minimize the possibility of creation of a spark, while also minimizing the required capacity and insulation of the control switch. Another switch can be provided at the outer end portion of the cable, for controlling the rotation of the windup reel. Such an "in" switch and the relay it controls, are constructed so that the reel is turned to wind up cable, only so long as the "in" switch continues to be manually depressed. The reel stops when the switch is no longer depressed, to encourage the technician to hold the outer end of the cable above the ground and apply some tension to the cable as the cable is being wound onto the reel.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for avoiding damage to electrical cables, such as those used at airports to connect a power source to an airplane on the ground or other power consuming device, during cable stowage by motor-operated devices, comprising:
   an electrical cable with inner and outer end portions, including a plurality of power conductors with inner end portions for connection to the power source and outer end portions, and an outer connector at the outer end portion of the cable for connecting said power conductors to said power consuming device;
   said cable including a manually operable switch located at said outer end portion of the cable;
   a cable storage device said inner end portion of said cable disposed at least partially within said storage device;
   a motor coupled to said storage device and operable to retract said cable; and
   motor control means responsive to manual operation of said switch for operating said motor to retract said cable, said switch and motor control means constructed so that said motor continues to be operated to cause said storage device to retract, only while said switch continues to be manually operated, to assure that a person holds the outer end portion of the cable during its movement into the storage device.

2. The apparatus described in claim 1 wherein:
   said electrical power source supplies a predetermined high voltage across at least two of said power conductors, and said cable includes a plurality of conductors including said power conductors and at least one low voltage conductor, and including means for applying a low voltage that is less than half said high voltage between said low voltage conductor and a second one of said conductors of said cable;
   said switch is connected between said low voltage conductor and said second conductor;
   said motor control means is responsive to operation of said switch, for applying current to said motor to retract said cable, whereby to help avoid creation of a large spark near the outer end of said cable when said switch is operated.

3. In a system for use at an airport to connect a power source to an aircraft, which includes a long cable having an inner end that can be connected to an electrical power source and an outer end that can be connected to the aircraft, and which includes a cable storage device at the inner end of the cable and a motor for operating the storage device to retract the cable, the improvement comprising:
   a manually operable switch which is at the outer end of the cable and manually operable from a first state to a second state and means responsive to operation of said switch to said second state for operating said motor to retract the cable;
   said switch tending to remain in said first state and requiring continued manual operation to remain in said second state, and said means for operating said motor operating substantially only while said switch is in said second state, wereby to encourage a person to hold the cable outer end above the ground while retracting the cable.

* * * * *